United States Patent [19]

Stauffer

[11] 4,117,620

[45] Oct. 3, 1978

[54] RELEASE DEVICE FOR DEADFALL TRAPS

[76] Inventor: Eric Stauffer, 3964 Old Lakelse Lake Dr., Terrace, B. C., Canada, V8G 3V1

[21] Appl. No.: 773,323

[22] Filed: Mar. 1, 1977

[51] Int. Cl.[2] .............................. A01M 23/00

[52] U.S. Cl. .............................. 43/77

[58] Field of Search .............................. 43/77, 78, 82; 292/DIG. 60

[56] References Cited

FOREIGN PATENT DOCUMENTS 473,621 12/1977 Fed. Rep. of Germany .............. 43/77

*Primary Examiner*—Clifford D. Crowder

*Attorney, Agent, or Firm*—Carver and Company

[57] ABSTRACT

A release device for deadfall traps of the type having a load line for supporting a deadfall in a raised position, the device having a load line engaging arm swingably mounted on a body which is maintained in an engaging position by engagement with a movable detent member the latter being held in a set position by a movable trigger. When the trigger is moved out of engagement with the detent member by the detent members swings away from the arm and allows the latter to swing to the release position to thereby release the load line and allow the deadfall to drop.

1 Claim, 2 Drawing Figures

RELEASE DEVICE FOR DEADFALL TRAPS

BACKGROUND OF THE INVENTION

1. Field of the Invention

This invention relates to traps and in particular to release devices for deadfall traps.

2. Prior Art

Of the many and varied types of deadfall traps one of the most practical is the type in which the deadfall itself can be constructed of components which may be found near a proposed trap site, such components being heavy logs etc, as the trapper need only carry with him, or to the trap site a length of rope which can be secured between the deadfall and the suitably positioned tree for holding the deadfall in a raised position and a trigger mechanism associated with the load line and which is operated by animal seizing a piece of bait beneath the deadfall to release the load line and allow the deadfall to drop on the animal.

Prior art release mechanism for this purpose have not been entirely successful. Some require a heavy trigger pull and other are sometimes rendered inoperative by ice and snow.

SUMMARY OF THE INVENTION

The present invention provides a release mechanism for releasing load line of deadfall traps which is simple of construction and operation, is relatively inexpensive to manufacture and, furthermore is not as highly subject to inoperation in ice and snow conditions.

The release mechanism of the present invention has, an elongated body member adapted to be anchored at one end, a load line engaging member swingably mounted at the opposite end of the body member for free swinging movement between a load line engaging position and a load line release position, an elongated detent member swingably mounted intermediate its end on the body member for free swinging movements between a set position in which one end engages the arm member for retaining the latter in the engaging position and release position free of the arm members so as to allow the arm member to swing to the release position, a trigger swingably mounted on the body member adjacent the opposite end of the detent member adapted to be secured to a trigger line for releasably engaging and locking the detent member in the said position when the trigger line stuck and for releasing the detent member so as to allow the latter to swing to the release position when the trigger line is tensioned.

A detailed description following, related to drawings, gives exemplification of apparatus according to the invention which, however, is capable of expression in means other than those particularly described and illustrated.

DETAILED DESCRIPTION

Figure 2:
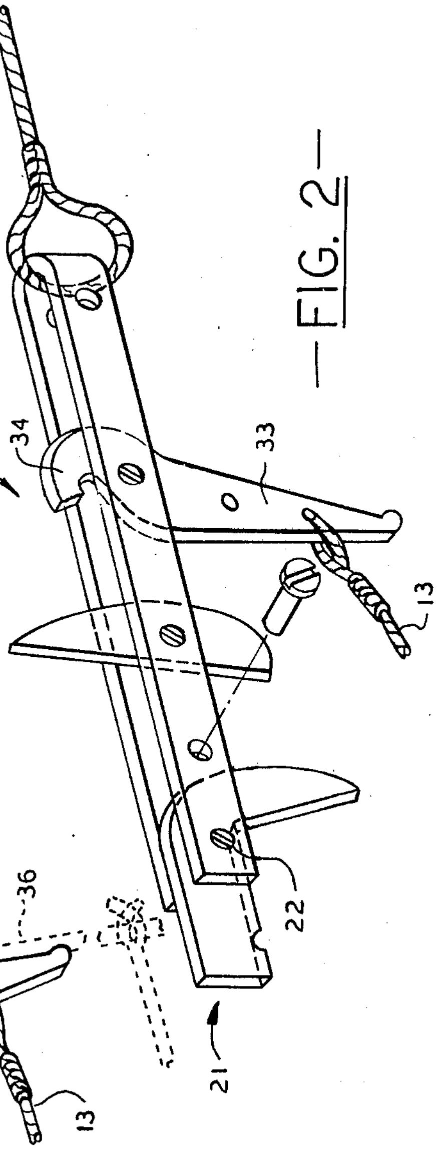
FIG. 2 is a perspective view of the release mechanism in a release position.

Referring to the drawings the release mechanism, generally 10, is used in association with a load line 11, an anchor line 12 and trigger line 13. The load line, as is common, extends to a deadfall (not shown) and is normally strong enough to support the deadfall in a raised position. The anchor line 12 which is connected to the release mechanism is of sufficient length to enable it to be secured to a nearby tree. The trigger line extends to a piece of bait of the like, not shown, which is positioned beneath the deadfall.

The release mechanism 10 has a U-shaped body member 15 having a pair of parallel arms 16—16 and U-shaped base 17, the arms having free ends 18—18.

A load line engaging member 21 is mounted on a pin 22 extending between the arms 16 adjacent their ends 18 for swinging movement. The member 21 is L-shaped having load line engaging arm 23 which is adapted to receive a loop 24 of the load line, and a tongue 25 which extends at right angles to the arm 23. The tongue 25 is adapted to engage and extend over one end 26 of an elongated detent member 27 which is mounted intermediate its end for free swinging movement on a transverse pin 28. The opposite end 27 of the detent which has a substantially sharp configuration is adapted to be releasably engaged by a trigger 31.

The trigger 31 which is pivotly mounted on a transverse pin 32 extending between the arms 16—16 has an elongated lever portion 33 and a hooked head portion 34. The lever portion is provided with a plurality of holes 35 through any one of which the trigger line 13 can be threaded. Alternatively, as shown in broken outline in FIG. 1, a trigger extension 36 such as a length of wood can be bound by cord to the lever portion and the trigger line secured to the free end of the extension. The hooked head portion 34 is adapted to extend over the end 27 of the detent as shown in FIG. 1.

Figure 1:
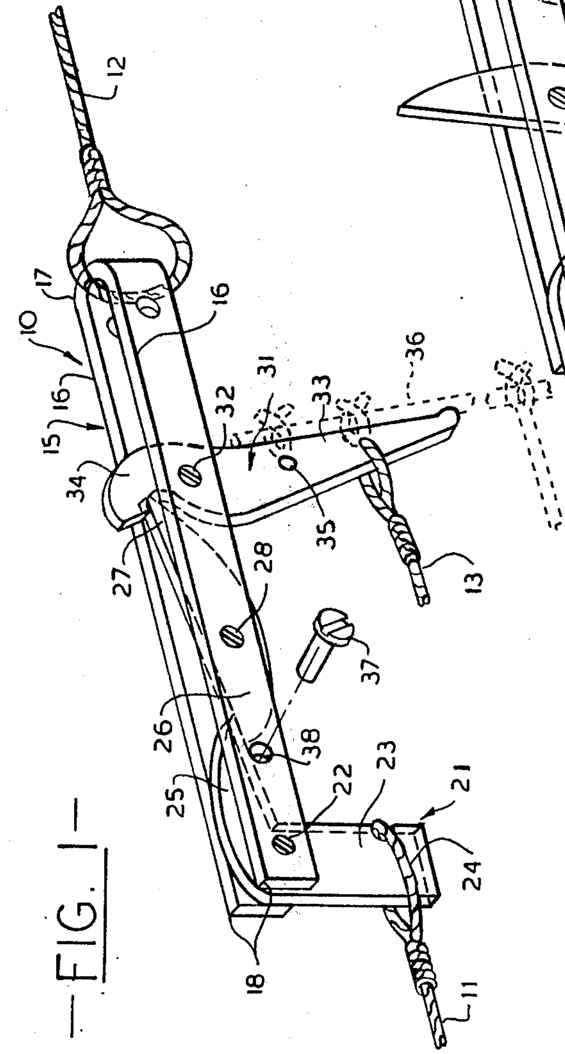
FIG. 1 is a perspective view of the release mechanism of the invention in a set position.

The load line restraining member 21 is normally held in a set position as shown in FIG. 1, by means of a locking pin 37 which can be extended through holes 38—38 formed in the arm 16. The locking pin when inserted, extends beneath the tongue 25 to prevent the arm 23 rotating to the release position (FIG. 2) under tension applied through the load line 11.

With the release mechanism in the set position of FIG. 1 tension applied to the trigger line by an animal attempting to disturb the bait to which the trigger line is attached will result in operation of the trigger which will thus free the detent and allow the load line restraining member to swing to the release position (FIG. 2) which thus results in release of the load line to spring the trap.

The release mechanism is capable of wide adjustment relative to trigger line tension reguired for trap operation. If the trap is to be used for trapping small animals the trigger line can be secured near the end of the lever arm of the trigger or to the trigger extension so as to increase the lever advantage. Operating pressure can also be adjusted by adjustment of meeting surfaces of the trigger and detent. These surfaces can be arranged to provide either positive or friction lock of the trigger and the detent to suit trigger line tension for the type of animal for which the trap is set.

I claim:

1. A release device for deadfall traps of the type having a load line for securing a deadfall in a raised position, the device comprising:

(a) an elongated body member adapted to be anchored at one end, (b) an L-shaped load line engaging member having a load line engaging arm and a detent engaging arm swingably mounted at the opposite end of the body member for free swinging movement between a load line engaging position in which the load line engaging arm extends substantially at right angles to the body member for receiving a loop of load line and a release position in which the load line engaging arm extends substantially in alignment with the body member for releasing the load line, (c) an elongated detent member swingably mounted intermediate its ends on the body member adjacent the load line engaging member for free swinging movement and being adapted to be disposed in a set position in which one end extends in the path of and engages the detent engaging arm of the load line member when the latter is arranged in the load line engaging position, (d) a trigger member swingably mounted on the body member adjacent said one end of the latter, the trigger member having a hooked head portion adapted to be swung into engagement with the opposite end of the detent member when the latter is arranged in a set position for preventing swinging movement of the latter so as to maintain the load line engaging member in the load line engaging position against the pull of the load line, the trigger member having a lever portion for connection to a bait line for swinging the hooked member, upon tension being applied to the bait line, out of engagement with the detent member so as to enable the load line engaging member to swing to the release position.

* * * * *